(No Model.)
P. SOULIER.
CALCULATING APPARATUS.
No. 517,308.          Patented Mar. 27, 1894.
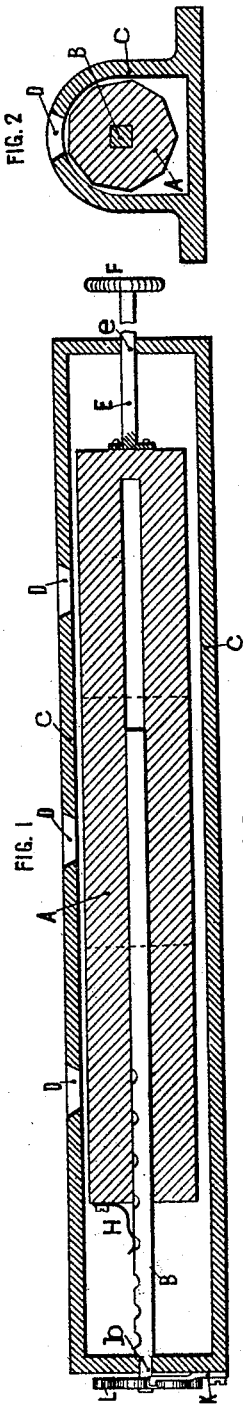
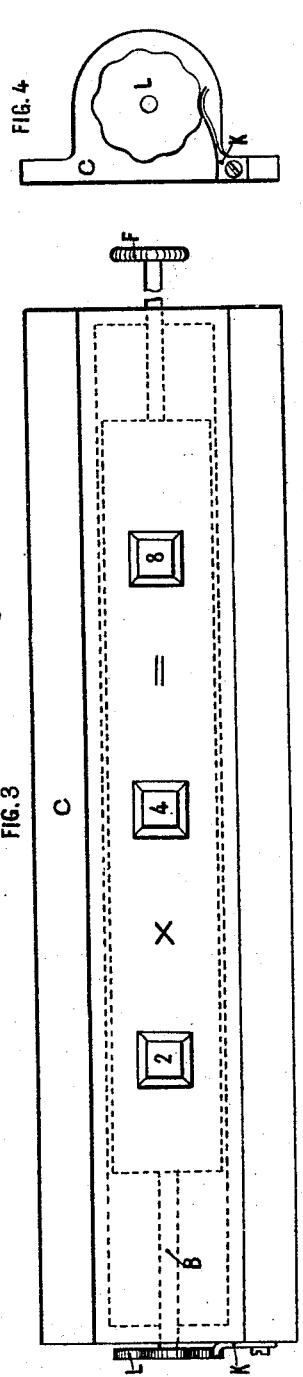
| 9 | 18 | 27 | 36 | 45 | 54 | 63 | 72 | 81 |
|---|----|----|----|----|----|----|----|----|
| 8 | 16 | 24 | 32 | 40 | 48 | 56 | 64 | 72 |
| 7 | 14 | 21 | 28 | 35 | 42 | 49 | 56 | 63 |
| 6 | 12 | 18 | 24 | 30 | 36 | 42 | 48 | 54 |
| 5 | 10 | 15 | 20 | 25 | 30 | 35 | 40 | 45 |
| 4 | 8 | 12 | 16 | 20 | 24 | 28 | 32 | 36 |
| 3 | 6 | 9 | 12 | 15 | 18 | 21 | 24 | 27 |
| 2 | 4 | 6 | 8 | 10 | 12 | 14 | 16 | 18 |
| 1 | 2 | 3 | 4 | 5 | 6 | 7 | 8 | 9 |
| 9 | 9 | 9 | 9 | 9 | 9 | 9 | 9 | 9 |
| 8 | 8 | 8 | 8 | 8 | 8 | 8 | 8 | 8 |
| 7 | 7 | 7 | 7 | 7 | 7 | 7 | 7 | 7 |
| 6 | 6 | 6 | 6 | 6 | 6 | 6 | 6 | 6 |
| 5 | 5 | 5 | 5 | 5 | 5 | 5 | 5 | 5 |
| 4 | 4 | 4 | 4 | 4 | 4 | 4 | 4 | 4 |
| 3 | 3 | 3 | 3 | 3 | 3 | 3 | 3 | 3 |
| 2 | 2 | 2 | 2 | 2 | 2 | 2 | 2 | 2 |
| 1 | 1 | 1 | 1 | 1 | 1 | 1 | 1 | 1 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
| 1 | 2 | 3 | 4 | 5 | 6 | 7 | 8 | 9 |
Witnesses:
Inventor:
Paul Soulier
by James L. Norris
Atty

UNITED STATES PATENT OFFICE.

PAUL SOULIER, OF PARIS, FRANCE.

CALCULATING APPARATUS.

SPECIFICATION forming part of Letters Patent No. 517,308, dated March 27, 1894.

Application filed November 15, 1893. Serial No. 491,017. (No model.)

*To all whom it may concern:*

Be it known that I, PAUL SOULIER, a citizen of the French Republic, residing at Paris, in the Department of the Seine, France, have invented a new and useful Calculating Apparatus, of which the following is a specification.

This invention relates to an improved calculating apparatus which can be readily handled, and by means of which multiplications can be rapidly effected. It is more particularly devised for the use of children, to whom it offers a means of quickly learning the Pythagorean table.

In order that my invention may be readily understood, I will describe the same fully with reference to the accompanying drawings, in which—

Figure 1 is a longitudinal section, Fig. 2 a transverse section, Fig. 3 a plan, and Fig. 4 an end view of the apparatus. Fig. 5 shows the developed surface of the prism bearing the three series of numbers.

This apparatus consists essentially of a nine-sided straight prism or roller A, along the middle of which is a square hole, wherein is loosely fitted, in the direction of its length, a rectangular rod B, movable with the prism about its axis $b$.

E is a rod terminating in a button F, and fixed to the end of the prism A; it serves to impart to it: first, a rectilinear sliding movement along the rod B, second a rotary movement around the axes $b$, $e$.

For the purpose of maintaining the prism in the required position, while being worked, the rod B is provided with a number of notches into which a spring H, fixed to the prism, engages. The rectilinear movement of this prism can therefore only take place by exerting a certain but slight effort on the button F, the pressure of the spring being, however, sufficient to prevent the prism shifting of its own accord. It is the same for the rotary movement of the prism, a spring K, forming a break, bearing constantly against a wheel L mounted on the rod B. The prism A carries, on its surface, three tables, the development of which is shown on a larger scale in Fig. 5. Each table is divided horizontally and vertically into nine divisions forming eighty-one spaces. In the left hand table, which gives the figures of the multiplicator, the figures from 1 to 9 are placed in the vertical spaces; in the middle table, which corresponds to the figures of the multiplicand, the same figures are arranged horizontally; and in the spaces of the third table, that to the right hand are inscribed on each horizontal line, the products of the numbers of the same horizontal line of the second table by the corresponding figure of the first table. The prism A is mounted in a casing C, of any suitable form, having, at top, three sight-holes D arranged at a distance, one from the other, of the length of nine spaces of the table. The multiplicator and the multiplicand are brought opposite the two sight-holes to the left, the third sight-hole serving for reading off the product of these two factors. The two ends of the casing serve as bearings for the rods B and E supporting the prism or roller A.

The working of my multiplication apparatus is as follows: To read off the product of any figure, say 4, of the second table, by any figure, say 2, of the first table, it is necessary to effect the two following movements: First. By acting on the button F, the prism is rotated until the given multiplicator 2 appears at the first sight-hole D on the left, the break spring K (represented in Fig. 4) insuring the fixity of this position and preventing the prism turning round during the next movement. Second. By means of the said button F, the prism is caused to slide longitudinally until the given multiplicand 4, appears at the middle sight hole; during this movement the figure 2 has still remained in sight at the sight-hole on the left, and when 4 comes under the middle sight-hole the product may be read off at the sight-hole on the right.

The apparatus may be made of any suitable material, and its shape and dimensions may be varied. By increasing its dimensions, it can be used with multiplicators and multiplicands higher than nine.

I also do not limit myself to the first nine figures, and the means of operating would remain exactly the same with multiplicators or multiplicands composed of higher numbers.

Instead of using a prism, I may use a cylinder, and the spring stops corresponding to the lines of the numbers would be retained so as to insure stability for the positions of the readings.

The casing besides containing the calculating apparatus, may also have other compartments which may be utilized for other purposes, such as for holding pen racks, pencil boxes, inkstands, or other articles.

Having described my invention, I claim and desire to secure by Letters Patent—

A multiplication apparatus consisting of a roller, preferably prismatic, furnished with three series or tables of numbers, and capable of rotating and sliding in a casing provided with sight-holes, so as to give the product of any two figures of the two first series or tables, after a rotary as well as a sliding movement have been imparted to the roller or prism, substantially as described.

In testimony whereof I have signed this specification in the presence of two subscribing witnesses.

PAUL SOULIER.

Witnesses:
BATTMANY EMILE,
VICTOR FOUR.